United States Patent
Nemoto (10) Patent No.: US 8,548,647 B2
(45) Date of Patent: Oct. 1, 2013

(54) VEHICLE CONTROL APPARATUS AND VEHICLE CONTROL SYSTEM

(75) Inventor: Yusuke Nemoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/810,699

(22) PCT Filed: Jul. 25, 2011

(86) PCT No.: PCT/IB2011/001718
§ 371 (c)(1),
(2), (4) Date: Jan. 17, 2013

(87) PCT Pub. No.: WO2012/014041
PCT Pub. Date: Feb. 2, 2012

(65) Prior Publication Data
US 2013/0124064 A1 May 16, 2013

(30) Foreign Application Priority Data
Jul. 27, 2010 (JP) .................................. 2010-168634

(51) Int. Cl.
*G05D 1/00* (2006.01)

(52) U.S. Cl.
USPC ............................................................. 701/2

(58) Field of Classification Search
USPC ............................................................. 701/2
See application file for complete search history.

(56) References Cited

U.S. PATENT DOCUMENTS

| | | | |
|---|---|---|---|
| 6,185,499 B1* | 2/2001 | Kinoshita et al. | 701/96 |
| 6,186,259 B1* | 2/2001 | Shimizu et al. | 180/204 |
| 7,548,634 B2* | 6/2009 | Kudo | 382/103 |
| 2004/0193372 A1 | 9/2004 | MacNeille et al. | |
| 2005/0125115 A1* | 6/2005 | Hiwatashi et al. | 701/25 |
| 2005/0201590 A1* | 9/2005 | Kudo | 382/103 |
| 2009/0043465 A1* | 2/2009 | Tomita | 701/51 |
| 2010/0121515 A1* | 5/2010 | Izumi | 701/22 |
| 2010/0250042 A1* | 9/2010 | Shamoto | 701/22 |
| 2011/0118939 A1* | 5/2011 | Kawamata et al. | 701/41 |
| 2011/0270513 A1 | 11/2011 | Shida | |
| 2013/0046421 A1* | 2/2013 | El Fassi et al. | 701/2 |
| 2013/0131901 A1* | 5/2013 | Yamagata et al. | 701/22 |

FOREIGN PATENT DOCUMENTS

| | | |
|---|---|---|
| EP | 0 263 262 A2 | 4/1988 |
| JP | A-63-098706 | 4/1988 |
| JP | A-2010-244346 | 10/2010 |
| WO | WO 2010/084568 A1 | 7/2010 |

* cited by examiner

*Primary Examiner* — Hussein A. Elchanti
(74) *Attorney, Agent, or Firm* — Oliff & Berridge, PLC (57) ABSTRACT

A vehicle control apparatus includes: a communication device installed in a vehicle to receive, from outside the vehicle, information relating to another vehicle; and a control device installed in the vehicle to perform travel control on the vehicle using information relating to the vehicle and the information relating to the other vehicle, wherein the control device modifies a control type of the travel control in accordance with either a condition relating to the travel control currently underway or a condition of the vehicle currently being subjected to the travel control.

5 Claims, 3 Drawing Sheets

VEHICLE CONTROL APPARATUS AND VEHICLE CONTROL SYSTEM

BACKGROUND OF THE INVENTION

1. Field of the Invention

The invention relates to a vehicle control apparatus and a vehicle control system for performing predetermined control on the basis of information relating to another vehicle traveling near a host vehicle.

2. Description of Related Art

A conventional vehicle control system (vehicle control apparatus) of this type is disclosed in Japanese Patent Application Publication No. 63-098706 (JP-A-63-098706), for example. JP-A-63-098706 discloses a technique for controlling a vehicle interval between at least two vehicles by performing inter-vehicle communication between the vehicles.

Incidentally, in a case where information relating to traveling vehicles is exchanged between the vehicles through communication and predetermined control (the vehicle interval control described in JP-A-63-098706; for example) is performed on the basis of received information relating to the other vehicle, it may be impossible, depending on the type the control, to execute the control appropriately if the accuracy of the information is low, for example.

SUMMARY OF THE INVENTION

The invention provides a vehicle control apparatus and a vehicle control system with which travel control can be executed appropriately.

A first aspect of the invention is a vehicle control apparatus including: a communication device installed in a vehicle to receive, form outside the vehicle, information relating to another vehicle from a vehicle exterior; and a control device installed in the vehicle to perform travel control on the vehicle using information relating to the vehicle and information relating to the other vehicle, wherein the control device modifies a control type of the travel control in accordance with either a condition relating to the travel control currently underway or a condition of the vehicle currently being subjected to the travel control.

The control device may modify the control type of the travel control on the basis of a deviation between a control target value of a control subject of the travel control and an actually measured value of the control subject obtained during the travel control executed at the control target value.

Further, the control device may switch the control type of the travel control between model based control based on a vehicle model and proportional derivative (PD) control in which proportional control and derivative control are executed, on the basis of the actually measured value and the control target value of the control subject of the travel control.

Further, the travel control may be executed to control a vehicle interval relative to the other vehicle.

A second aspect of the invention is a vehicle control system including: a communication device installed in each of a plurality of host vehicles to receive, from outside the host vehicle, information relating to another vehicle; and a control device installed in each of a plurality of host vehicles to perform travel control on the host vehicle using information relating to the host vehicle and information relating to the other vehicle, wherein each of a plurality of the control devices modifies a control type of the travel control in accordance with either a condition relating to the travel control currently underway or a condition of the host vehicle currently being subjected to the travel control.

Here, each of the plurality of control devices may modify the control type of the travel control while maintaining a number of the plurality of host vehicles.

The vehicle control apparatus and the vehicle control system according to the invention are capable of modifying the control type of the travel control in accordance with the condition relating to the travel control currently underway or the condition of the vehicle currently being subjected to the travel control, and it is therefore possible to switch between appropriate travel control types corresponding to the conditions.

BRIEF DESCRIPTION OF THE DRAWINGS

The foregoing and further objects, features and advantages of the invention will become apparent from the following description of example embodiments with reference to the accompanying drawings, wherein like numerals are used to represent like elements, and wherein.

DETAILED DESCRIPTION OF EMBODIMENTS

An embodiment of a vehicle control system (vehicle control apparatus) according to the invention will be described in detail below on the basis of the drawings. Note that the invention is not limited by this embodiment.

Figure 1:
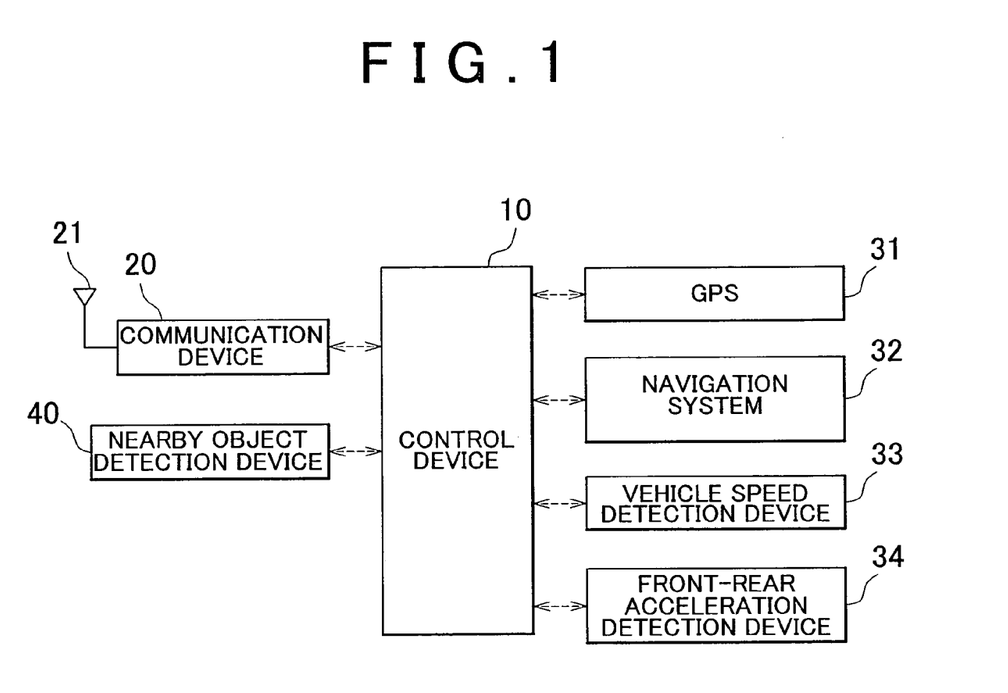
FIG. 1 is a view showing the constitution of a vehicle control system (vehicle control apparatus) according to an embodiment of the invention.
Figure 2:
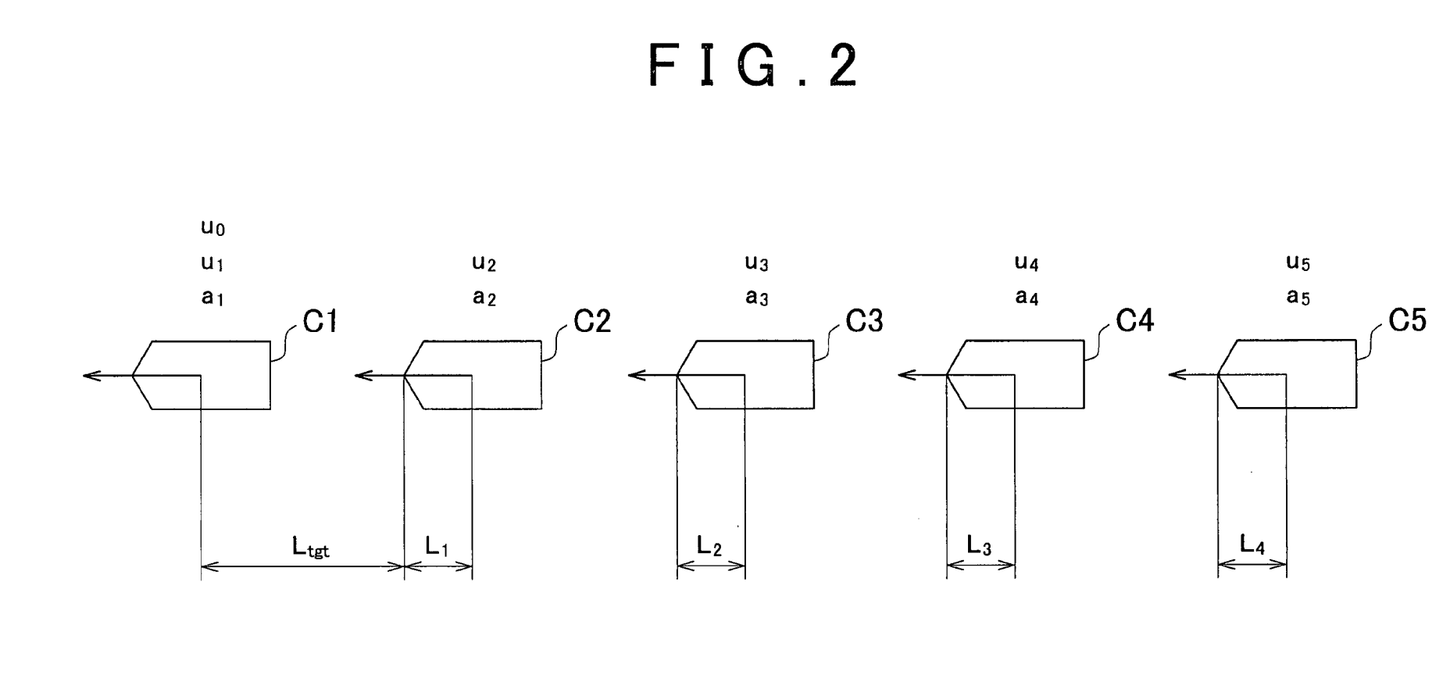
FIG. 2, is a view illustrating linear quadratic (LQ) control.
Figure 3:
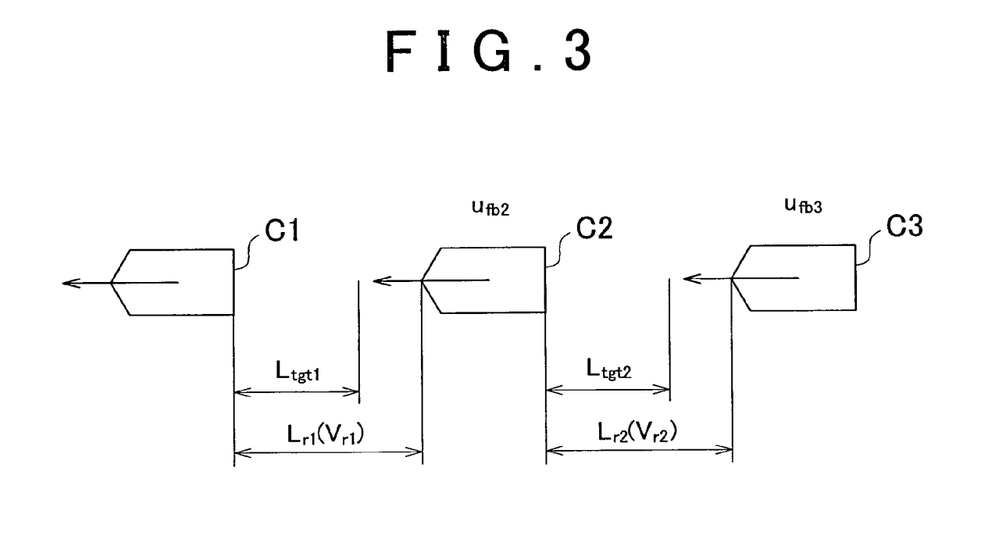
FIG. 3 is a view illustrating PD control.

An embodiment of the vehicle control system (vehicle control apparatus) according to the invention will now be described on the basis of FIGS. 1 to 3.

A vehicle control system according to this embodiment is capable of transmitting and receiving information relating to respective vehicles to and from nearby vehicles using wireless communication, and executing travel control using host vehicle and other vehicle information shared by the respective vehicles. Here, vehicle interval control between a plurality of vehicles will be used as an example of the travel control. In other words, in this example, the vehicle control system is applied to a vehicle interval automatic control system to be described below. This system is realized by installing constitutional elements (a vehicle control apparatus) shown in FIG. 1 in a vehicle. In this example, the constitutional elements shown in FIG. 1 are installed in both a host vehicle according to the system and another vehicle near the host vehicle (a preceding vehicle and a following vehicle, for example). A control operation according to the system is executed by a control device (an ECU) 10 shown in FIG. 1.

The vehicle interval automatic control system performs so-called Adaptive Cruise Control (ACC) to control the vehicle interval to a set target inter-vehicle distance and a set target inter-vehicle time. By shortening the vehicle interval to achieve the target inter-vehicle distance and target inter-vehicle time, the vehicle interval automatic control system is capable of reducing air resistance received by the following vehicle, and as a result, a fuel efficiency of the following vehicle can be improved. Further, by shortening the vehicle interval, the vehicle interval automatic control system can increase a number of vehicles passing a certain point on a road per unit time (a so-called traffic capacity), which is useful in alleviating road congestion.

The vehicle interval control executed by the vehicle interval automatic control system according to this example is not limited to vehicle interval control between a front-rear pair of vehicles, which is performed when following a single preceding vehicle or when being followed by a single following vehicle, and also includes vehicle interval control executed on each of a plurality of vehicles forming a single platoon (a vehicle group) during platooning, in which the vehicles travel in a platoon while following a preceding vehicle or being followed by a following vehicle.

In the vehicle interval automatic control system, various information is exchanged between the vehicles using a vehicular wireless communication technique, and a control target value of the vehicle interval control is set on the basis of the information or information required for vehicle interval control included in the information. The vehicle interval automatic control system then executes vehicle control corresponding to the control target value, whereby the vehicle interval is controlled to match a target inter-vehicle distance (a target inter-vehicle time) serving as a control target value. In other words, the vehicle interval automatic control system executes information communication type vehicle interval control (ACC, for example).

A communication device 20 that performs vehicular wireless communication is connected to the control device 10. The communication device 20 is controlled by the control device 10 to transmit various information to be described below, (identification information, travel information, control target value information, driver operation information, vehicle specification information, communication standard information, travel environment information, and so on), which is exchanged between the vehicles in the vehicle interval automatic control system, from an antenna 21.

The following types of communication may be used as the vehicular wireless communication. For example, this type of wireless communication includes communication in which information is exchanged between vehicles directly and communication in which information is exchanged between vehicles indirectly via a communication facility laid on the outside of the vehicles. Vehicle-to-vehicle communication, in which information is exchanged between vehicles directly, may be cited as an example of the former type of wireless communication. Vehicle-road-vehicle communication, in which information is exchanged between vehicles via a communication facility (a roadside device) laid on the outside of the vehicles, and communication in which information is exchanged between the vehicles using a communication infrastructure such as the Internet via a communication facility (a base station such as an information center) laid on the outside of the vehicles, may be cited as examples of the latter type of wireless communication. During platooning, both the immediately preceding vehicle and any other preceding vehicles in the vehicle group and both the immediately following vehicle and any other following vehicles in the vehicle group may serve as a communication partner, regardless of whether information is exchanged directly or indirectly.

The vehicle-road-vehicle communication described above is an example of an application of road-vehicle communication in which information is exchanged between the communication device 20 of the vehicle and the communication facility (roadside device) laid on the outside of the vehicle. Road-vehicle communication is used when the vehicle receives information such as congestion conditions and traffic signal conditions relating to the road ahead.

Examples of the various information exchanged between the vehicles include identification information, travel information, control target value information, driver operation information, vehicle specification information, communication standard information, travel environment information, and so on. Detection devices and the like for obtaining this information are installed in the vehicle. The information (detection signals or the like) obtained by the detection devices and so on is transmitted to the control device 10.

The identification information is information for specifying and identifying an information transmission source. In the vehicle interval automatic control system, vehicle identification information for specifying and identifying the vehicle itself is set in the vehicle in advance. Note that the vehicle identification information may be conveyed at the time of communication. During platooning, vehicle group identification information for specifying and identifying the vehicle group may also be conveyed. The vehicle group identification information is set by the control device 10 of one of the vehicles belonging to the vehicle group (a leading vehicle, for example) at the start of the platooning, for example, and conveyed to the respective vehicles through wireless communication. During platooning, variation may occur in the vehicles belonging to the vehicle group when a new vehicle joins the group, when a vehicle leaves the group, and so on. In the vehicle interval automatic control system, new vehicle group identification information may be conveyed anew when variation occurs in the vehicles belonging to the vehicle group. Alternatively, when a new vehicle joins the vehicle group, pre-existing vehicle group identification information may be conveyed to the newly joined vehicle. When a vehicle leaves the vehicle group, on the other hand, the vehicle group identification information held in the departing vehicle is deleted by the control device 10 of the departing vehicle.

The travel information is measured information and estimated information obtained as the host vehicle travels. Examples of the travel information include information indicating a current position and an advancement direction of the host vehicle. Measured information obtained by a Global Positioning System (GPS) 31, for example, may be used as the current position information. The advancement direction information may be estimated from change in the measured information obtained by the GPS 31 or estimated on the basis of information indicating a directional indicator operation direction and a steering angle, to be described below, for example. Map information from a navigation system 32 may be used together with the estimated information obtained by the GPS 31 as the current position information and the advancement direction information. The travel information may also include vehicle speed information relating to the host vehicle, vehicle acceleration information (vehicle deceleration information) relating to the host vehicle, vehicle lateral acceleration information relating to the host vehicle, jerk information relating to the host vehicle, yaw rate information relating to the host vehicle, pitch angle information relating to the host vehicle, and roll angle information relating to the host vehicle. This travel information is obtained on the basis of detection values from various sensors installed in the host vehicle, such as a vehicle speed sensor (a vehicle speed detection device 33) and an acceleration sensor.

The control target value information is information indicating a control target value of the host vehicle required during vehicle interval control with another vehicle. The control target value information includes information indicating the aforesaid target inter-vehicle distance and target inter-vehicle time, and a target vehicle speed, a target vehicle acceleration or target vehicle deceleration (to be referred to hereafter as a "target vehicle acceleration/deceleration"), and a target jerk of the host vehicle set in order to realize the target inter-vehicle distance and target inter-vehicle time. The control device 10 sets control target values pertaining to the vehicle interval control on the basis of the received other vehicle information.

The driver operation information includes information indicating an amount by which the driver operates an input device of the host vehicle and information indicating whether or not the input, device has been operated. The former operation amount information includes information indicating an accelerator operation amount (an throttle valve opening or the like) of an accelerator pedal, information indicating a brake operation amount (a brake pressure or the like) of a brake pedal, operation direction information indicating whether a directional indicator has been operated to the left or the right, information indicating a steering angle of a steering wheel, information indicating an operating condition of a headlamp switch (information indicating whether the headlamp is at high beam, low beam, or small beam), and so on. The latter operation information, meanwhile, includes information indicating whether or not the brake has been operated (whether a brake lamp switch is ON or OFF), information indicating whether or not the directional indicator has been operated, information indicating whether or not the headlamp switch has been operated, information indicating whether or not a wiper switch has been operated, information indicating whether or not a switch operation has been performed on another device such as an air-conditioner or audio equipment, and so on.

The vehicle specification information includes not only information determined in advance as design values of the vehicle, but also information that does not vary frequently. For example, the specification information includes a vehicle weight, a maximum vehicle braking force (a maximum vehicle deceleration depending on a road surface friction coefficient), a maximum accelerating force (a maximum vehicle acceleration), a maximum jerk, vehicle response characteristic information, a responsiveness of various actuators (a response speed to a control command), equipment information, and so on. Here, the vehicle response characteristic information is information indicating an output responsiveness exhibited during control at the control target values, and corresponds to information relating to a time constant Ts in a following Equation 1 or the like, for example. Equation 1 shows the response characteristic at an actual vehicle acceleration/deceleration $a_{actual}$ relative to a target vehicle acceleration/deceleration $u_{target}$. In Equation 1, "s" is a Laplacian operator. Further, the actuators include a brake actuator, a throttle actuator, a transmission actuator, and so on. Furthermore, the equipment information includes a tire gripping performance and so on, for example.

$$a_{actual} = \frac{1}{1 + Ts * s} u_{target} \quad (1)$$

The communication standard information is information indicating a communication standard for two way wireless communication, a communication standard for a wireless local area network (LAN), a communication standard for a beacon, or the like, for example. Two-way communication performed during vehicular wireless communication includes Dedicated Short Range Communication (DSRC) and so on. The communication standard information also includes greeting information transmitted to a transmission destination, time constant information indicating a response delay in the various actuators described above, a flag indicating transfer information, and so on.

The travel environment information is information indicating the road surface along which the host vehicle is traveling. The travel environment information includes information indicating the road surface friction coefficient, information indicating a road surface gradient, information indicating a road surface temperature, information indicating whether the road surface is asphalted or unpaved, and information indicating whether the road surface is wet, dry, or frozen.

The control target values set during the vehicle interval control are principally the target inter-vehicle distance and the target inter-vehicle time, which serve as the main targets of the vehicle interval control. The target inter-vehicle distance (target inter-vehicle time) is set on the basis of current values of a relative speed, an inter-vehicle distance, and a relative vehicle acceleration between vehicles at a value which ensures that the inter-vehicle distance does not reach zero even if the preceding vehicle brakes rapidly or the like, for example. The relative speed and so on are calculated on the basis of received information relating to the preceding vehicle (information indicating the vehicle speed, position, and so on). In the vehicle interval automatic control system, a target vehicle speed, a target vehicle acceleration/deceleration, and a target jerk are set as actual control target values for the vehicle to be controlled on the basis of the target inter-vehicle distance (target inter-vehicle time).

For example, in the vehicle interval automatic control system, model based control based on a vehicle model is performed to execute vehicle interval control between respective vehicles such that a control subject (the inter-vehicle distance, the inter-vehicle time, and so on) matches the control target value (the target inter-vehicle distance and target inter-vehicle time). As a specific example, in this embodiment, optimization control (LQ control) for setting control target values of respective vehicles is executed such that optimization is achieved in a system including two or more vehicle models.

Here, an example of vehicle interval control (platooning control) through LQ control when five vehicles C1 to C5 shown in FIG. 2 travel in a platoon will be described. In the vehicle interval automatic control system, traveling conditions of following vehicles C2 to C5 are controlled in accordance with the traveling conditions of a leading vehicle C1 so that the following vehicles C2 to C5 follow the leading vehicle C1, whereby the vehicles C1 to C5 travel in the platoon at a target inter-vehicle distance $L_{tgt}$. At this time, all of the various information described above relating to the host vehicle and the other vehicles, or the required information of the various information, is shared among the vehicles C1 to C5 through wireless communication. Target vehicle acceleration/deceleration values $u_2$ to $u_5$ of the following vehicles C2 to C5 are then set on the basis of the shared information, whereupon the acceleration/deceleration values of the following vehicles C2 to C5 are controlled to match the respective target vehicle acceleration/deceleration values $u_2$ to $u_5$. The shared information at this time is constituted by vehicle acceleration/deceleration values (actually measured values obtained by a front-rear acceleration detection device 34 such as an acceleration sensor, or estimated values) $a_1$ to $a_5$ and the target vehicle acceleration/deceleration values $u_1$ to $u_5$ for the respective vehicles C1 to C5, as well as inter-vehicle distance errors $L_1$ to $L_4$ and relative speeds $L_1'$ to $L_4'$ ($dL_1/dt$ to $dL_4/dt$) between the respective vehicles arranged in series from front to rear.

In the platooning control, platooning of the vehicles C1 to C5 is represented by a time differential (Equation 2: state space equation) of a state vector x shown below using the target vehicle acceleration/deceleration values $u_2$ to $u_5$ of the following vehicles C2 to C5 as control input and the vehicle acceleration/deceleration values $a_1$ to $a_5$, the inter-vehicle distance errors $L_1$ to $L_4$, and the relative speeds $L_1'$ to $L_4'$ as state quantities.

$$x' = Ax + B_C u_C + B_0 u_0 + B_W u_W \quad (2)$$

Here, "$u_c$" in Equation 2 is a target vehicle acceleration/deceleration vector, "$u_0$" is the target vehicle acceleration/deceleration of the leading vehicle C1, and "$u_w$" denotes the road gradient or a disturbance such as wind. Further, "A", "$B_c$", "$B_0$", and "$B_w$" denote matrices determined by the specification information and so on of the respective vehicles C1 to C5. The state vector x and the target vehicle acceleration/deceleration vector $u_c$ are as follows.

$x = (a_1, L_1, L_1', a_2, L_2, L_2', a_3, L_3, L_3', a_4, L_4, L_4', a_5)^T$
$u_C = (u_2, u_3, u_4, u_5)^T$

The target vehicle acceleration/deceleration vector $u_c$ can be expressed as shown in a following Equation 3 using a feedback gain matrix K. The feedback gain matrix K according to this example is a 13 column×4 row matrix.

$$u_C = B_{ff} u_1 + Kx \quad (3)$$

$$B_{ff} = \begin{bmatrix} 1 \\ 1 \\ 1 \\ 1 \end{bmatrix}$$

A cost function J for performing LQ control on the system represented by the state space equation shown above (Equation 2) is determined as shown in a following Equation 4.

$$J = \int \left\{ \varepsilon_L (L_1^2 + L_2^2 + L_3^2 + L_4^2) + \varepsilon_{dL} \left( \frac{dL_1^2}{dt} + \frac{dL_2^2}{dt} + \frac{dL_3^2}{dt} + \frac{dL_4^2}{dt} \right) + \varepsilon_u (u_1^2 + u_2^2 + u_3^2 + u_4^2 + u_5^2) \right\} dt \quad (4)$$

In Equation 4, "$\varepsilon_L$", "$\varepsilon_{dL}$", and "$\varepsilon_u$" are weightings for weighting terms relating to the inter-vehicle distance errors $L_1$ to $L_4$, terms relating to the relative speeds $L_1'$ to $L_4'$, and terms relating to the target vehicle acceleration/deceleration values $u_1$ to $u_5$, respectively. Hence, during the platooning control, stability in the inter-vehicle distances, reductions in the relative speeds, and reduction in the acceleration/deceleration are balanced by adjusting the weightings $\varepsilon_L$, $\varepsilon_{dL}$, and $\varepsilon_u$.

The feedback gain matrix K for minimizing the cost function J is determined uniquely when the vehicles C1 to C5 forming the platoon are determined as a group.

During the platooning control, the target vehicle acceleration/deceleration vector $u_c$ for minimizing the cost function J is determined by substituting the feedback gain matrix K and the state vector x obtained on the basis of information from the various detection devices into Equation 3 and setting the target vehicle acceleration/deceleration $u_1$ of the leading vehicle C1 as a feedforward control value. In so doing, a combination of target vehicle acceleration/deceleration values $u_2$ to $u_5$ for minimizing the cost function J is determined. The respective control devices 10 of the following vehicles C2 to C5 control the respective following vehicles C2 to C5 so that the acceleration/deceleration values thereof match the corresponding target vehicle acceleration/deceleration values $u_2$ to $u_5$, and as a result, the vehicles C1 to C5 travel in a platoon.

Here, depending on the conditions of the vehicles currently subjected to the platooning control through LQ control and conditions relating to the platooning control through LQ control currently underway, it may be impossible to execute the control or to execute the control favorably, and in this case it is necessary to execute the platooning control using a control type other than LQ control.

Inappropriate vehicle conditions for LQ control, in which such cases arise, are as follows. For example, this situation arises when a preset response characteristic (the time constant Ts or the like) is transmitted and received but the received response characteristic deviates greatly from an actual response characteristic. The response characteristic may deviate from the preset value when the weight of the vehicle changes due to variation in the passengers and the load. This situation also arises when the respective response characteristics of the vehicles in the platoon are not shared due to a communication breakdown or the like, for example when the host vehicle does not know the response characteristics of the other vehicles or the other vehicles are not informed of the response characteristic of the host vehicle. Further, this situation arises when wheel slip suppression control or vehicle behavior stabilization control (so-called Vehicle Stability Control (VSC) or the like) is underway in one of the vehicles constituting the platoon.

A communication breakdown is a situation in which information cannot be received from a communication partner by wireless communication. A communication breakdown includes both a communication abnormality in which the partner communication device 20 has difficulty transmitting information or the host communication device 20 has difficulty receiving information from the partner, and a communication standby state in which the host communication device 20 waits for the partner to transmit information. The control device 10 performs a communication breakdown determination on the basis of the other vehicle information received during the platooning control through LQ control. In the communication breakdown determination according to the vehicle interval automatic control system, a communication abnormality is determined when a number of reception failures (a number per minute or the like) of the other vehicle information reaches a predetermined number within a predetermined communication period, for example. Further, in the communication breakdown determination according to the vehicle interval automatic control system, a communication standby state is determined when the other vehicle information cannot be received for a predetermined period (several seconds or the like), for example, regardless of whether or not the communication device 20 of the host vehicle is functioning normally. Note that it is difficult for the host vehicle to detect a condition in which the partner communication device 20 is having difficulty transmitting information, and therefore, in such situations, a communication standby state may be determined temporarily, after which a communication abnormality may be determined in accordance with the subsequent communication condition.

Meanwhile, examples of inappropriate platooning control conditions for LQ control include a situation in which the platooning control diverges or is in danger of diverging due to an increase in the aforesaid inter-vehicle distance errors $L_1$ to $L_4$, or in other words a situation in which a deviation occurs between a control target value and an actually measured value obtained when the platooning control is executed at the control target value. Further, when a new vehicle joins the platoon or some vehicles leave the platoon, information is shared by communication among the vehicles in the new platoon, the target vehicle acceleration/deceleration values of the following vehicles are set, and so on, and until this transitory state comes to an end, platooning control through LQ control cannot be executed. Hence, a transitory condition in which a new platoon is formed also corresponds to an inappropriate platooning control conditions for LQ control.

Therefore, in conditions where LQ control is preferably not employed (inappropriate conditions for LQ control), the platooning control is executed after switching to a control type other than LQ control.

Having recognized that this type of condition is established, the control device 10 halts the platooning control through LQ control and executes platooning control using a control type other than LQ control. PD control including proportional control for bringing the inter-vehicle distance to the preceding vehicle close to a target inter-vehicle distance and derivative control for bringing the relative speed relative to the preceding vehicle close to zero so that the inter-vehicle distance does not increase or decrease from the target inter-vehicle distance (i.e. suppressing deviation between the inter-vehicle distance and the target inter-vehicle distance) may be cited as an example of another control type. In platooning control through PD control, a target vehicle acceleration/deceleration $u_{fb}$ of a following vehicle is determined by performing feedback control on respective vehicle intervals thereof to a leading vehicle and an immediately preceding vehicle, for example. This control will now be described more specifically using a platoon constituted by three vehicles C1 to C3, shown in FIG. 3, as an example.

In the following vehicles C2 and C3, target inter-vehicle distances $L_{tgt1}$, $L_{tgt2}$ are set in accordance with the vehicle speed and so on. Further, in the following vehicles C2 and C3, current inter-vehicle distances $L_{r1}$, $L_{r2}$ and relative speeds $V_{r1}$, $V_{r2}$ relative to the immediately preceding vehicles C1 and C2 are measured by a nearby object detection device 40 provided on a front portion of the host vehicle.

The nearby object detection device 40 detects objects near the host vehicle. Here, the nearby object detection device 40 is used to detect vehicles near the host vehicle. The control device 10 detects vehicles near the host vehicle using a detection result from the nearby object detection device 40. The nearby object detection device 40 is disposed in a location enabling detection of another vehicle in a monitoring direction such as the front, rear, or sides of the host vehicle. In other words, the nearby object detection device 40 is disposed on the front portion of the vehicle if the front of the host vehicle is to be monitored, on a rear portion of the vehicle if the rear of the host vehicle is to be monitored, and on a right side portion and a left side portion of the vehicle if the sides of the host vehicle are to be monitored. In this example, the nearby object detection device 40 is disposed on at least the front portion.

A millimeter wave radar, an inexpensive laser radar, a close range radar such as an Ultra Wide Band (UWB) radar, a sonar using audible sound waves or ultrasonic waves, an image capturing device, and so on, for example, may be used as the nearby object detection device 40. Specific examples of the image capturing device include a visible light camera, an infrared camera (either including or not including an infrared projector), a single camera, a stereo camera, and so on. When a millimeter wave radar, a laser radar, a close range radar, or a sonar is used, the control device 10 of the host vehicle detects a preceding vehicle on the basis of a detection signal, and then calculates the inter-vehicle distance, relative speed, relative acceleration, and so on relative to the preceding vehicle. When an image capturing device is used, the control device 10 of the host vehicle detects a preceding vehicle on the basis of a captured image, and then calculates the inter-vehicle distance, relative speed, and so on relative to the preceding vehicle. Note that when position information relating to the preceding vehicle can be obtained from the GPS 31, the relative positional relationship between the host vehicle and the preceding vehicle may be determined on the basis of the position information relating to the preceding vehicle and the position information relating to the host vehicle using the GPS 31.

The control device 10 of the following vehicle C2 determines a target vehicle acceleration/deceleration $u_{fb2}$ from a following Equation 5 on the basis of the target inter-vehicle distance $L_{tgt1}$ to the immediately preceding vehicle C1 (the leading vehicle), the current inter-vehicle distance $L_{r1}$, and the current relative speed $V_{r1}$. In Equation 5, "k" and "c" are coefficients that can be adjusted similarly to the weightings $\epsilon_L$, $\epsilon_{dL}$, and $\epsilon_u$, described above. This applies likewise to "k1", "k2", "c1", and "c2" in a following Equation 6.

$$u_{fb2}=k*(L_{r1}-L_{tgt1})+c*V_{r1} \quad (5)$$

Further, the control device 10 of the following vehicle C3 receives the target inter-vehicle distance $L_{tgt1}$, the current inter-vehicle distance $L_{r1}$, and the current relative speed $V_{r1}$ between the preceding vehicles C1 and C2 through wireless communication, and determines a target vehicle acceleration/deceleration $u_{fb3}$ from the following Equation 6 on the basis of these values as well as the target inter-vehicle distance $L_{tgt2}$, the current inter-vehicle distance $L_{r2}$, and the current relative speed $V_{r2}$ between the following vehicle C3 and the immediately preceding vehicle C2. The two terms in the first half of Equation 6 represent feedback control relative to the leading vehicle C1, while the two terms in the second half represent feedback control relative to the preceding vehicle C2.

$$u_{fb3}=k1*\{(L_{r1}+L_{r2})-(L_{tgt1}+L_{tgt2})\}+c1*(V_{r1}+V_{r2})+k2*(L_{r1}-L_{tgt1})+c2*V_{r2} \quad (6)$$

The respective control devices 10 of the following vehicles C2, C3 control the respective following vehicles C2, C3 so that the vehicle acceleration/deceleration values thereof match the target vehicle acceleration/deceleration values $u_{fb2}$, $f_{fb3}$, and as a result, the vehicles C1 to C3 are caused to travel in a platoon.

Hence, according to this vehicle interval automatic control system, platooning can be continued even when LQ control is not appropriate by switching from LQ control to PD control.

Meanwhile, when the various conditions described above improve, it is preferable to switch from PD control to LQ control so that the vehicle intervals can be controlled with stability. Improvement in the various conditions means that the condition of the vehicles subjected to platooning control through PD control changes to a condition in which LQ control is preferable. For example, a condition appropriate for platooning control through LQ control is established when information is shared among all of the vehicles constituting the platoon. Platooning control through LQ control is also appropriate when the communication breakdown is repaired, or in other words when two way communication among all of the vehicles constituting the platoon stabilizes.

In the example described above, LQ control (optimization control), which is model based control, and PD control, which is non-model based control, are employed alternately depending on the conditions relating to the platooning control currently underway or the conditions of the vehicles currently being subjected to the platooning control. However, if it is possible to construct LQ control (optimization control) in a different form to that of the example described above on the basis of a different vehicle model, for example, the control device 10 may be caused to switch between LQ controls based on different vehicle models in accordance with the conditions relating to the platooning control currently underway and so on. Further, in the LQ control described above, the control type may be switched by modifying the cost function J. Moreover, if map data are used in the optimization control (LQ control), the control type may be switched by modifying the map data. Furthermore, if the reliability of a control parameter such as the inter-vehicle distance error $L_1$ to $L_4$ decreases and it is possible to correct the control parameter having low reliability, the control type may be switched by correcting the parameter, and if it is possible to delete the control parameter having low reliability, the control type may be switched by deleting the parameter.

Hence, in the vehicle interval automatic control system according to this embodiment, the control type of the platooning control can be modified in accordance with conditions relating to the platooning control currently underway and the conditions of the vehicles currently being subjected to the platooning control, and therefore appropriate platooning control corresponding to the conditions can be performed.

Here, other vehicle information received through communication is used in the LQ control and PD control described above. Therefore, when the other vehicle information cannot be received, the control may be switched to conventional vehicle interval control for controlling the interval to the immediately preceding vehicle. In other words, according to this vehicle interval automatic control system, conventional information detection type vehicle interval control (ACC) can also be executed. In information detection type vehicle interval control, information such as the inter-vehicle distance to the immediately preceding vehicle is measured by the nearby object detection device 40 installed in the front portion of the host vehicle, and control target values such as a target vehicle speed are set on the basis of this information.

Incidentally, LQ control performed on five vehicles C1 to C5 and PD control performed on three vehicles C1 to C3 were described in the above examples, but the number of vehicles subjected to control according to the respective control types may be maintained after the control type is modified. In other words, the control type may be modified in accordance with the conditions described above without varying the number of vehicles constituting the platoon. Further, the control type may be modified in accordance with the conditions described above even when the number of vehicles constituting the platoon does not change. Moreover, the control type may be modified in accordance with the conditions described above without varying the arrangement (order) of the vehicles constituting the platoon and even when the arrangement (order) does not change.

Furthermore, the combination of vehicles in the platoon may be varied according to the control type without varying the number of vehicles constituting the platoon. For example, when a condition requiring modification of the control type is established while vehicle interval control through LQ control is underway in a platoon constituted by three vehicles C1 to C3, the platoon may be divided into groups of vehicles having a direct leading/following relationship, i.e. a group consisting of the vehicles C1 and C2 and a group consisting of the vehicles C2 and C3, and the control executed on the groups may be switched to vehicle interval control through PD control or conventional information detection type vehicle interval control in accordance with the conditions. Moreover, in this case, the control type may be modified to vehicle interval control through PD control in one of the two groups and conventional information detection type vehicle interval control in the other group. Further, in a platoon constituted by the three vehicles C1 to C3, a situation may arise in which vehicle interval control through PD control is executed on a group consisting of the vehicles C1, C2 having a direct leading/following relationship while conventional information detection type vehicle interval control is executed on the vehicle C3 so that the vehicle C3 follows the group (more precisely, the vehicle C2). In this case, depending on the conditions, the group consisting of the vehicles C1, C2 may be switched to vehicle interval control through LQ control, a new group constituted by the vehicles C2, C3 having a direct leading/following relationship may be created, and the new group may be switched to vehicle interval control through LQ control.

Further, a vehicle appearing at the rear of the host vehicle may be detected by monitoring the rear of the host vehicle using the nearby object detection device 40. According to this vehicle interval automatic control system, information communication type vehicle interval control may be started when the nearby object detection device 40 detects a vehicle at the rear of a host vehicle traveling alone. Meanwhile, when the nearby object detection device 40 detects a new vehicle at the rear of a host vehicle traveling in a platoon in the vehicle interval automatic control system, information communication type vehicle interval control may be executed on the new platoon by transmitting the detection result from the host vehicle to the other vehicles in the vehicle group and transmitting the vehicle group identification information to the new following vehicle. Note that a new vehicle is detected not only when a new vehicle starts to follow a host vehicle traveling in a rearmost position but also when a new vehicle enters a platoon behind a host vehicle traveling in the middle of the platoon.

The sides of the host vehicle may also be monitored by the nearby object detection device 40. In this case, a vehicle traveling alongside the host vehicle in a different lane or the like can be detected by the vehicle interval automatic control system, making it possible to predict whether or not the vehicle is likely to enter the platoon in front or of behind the host vehicle.

Here, the measurement result obtained by the nearby object detection device 40 may be used during information communication type vehicle interval control. In other words, according to this vehicle interval automatic control system, information detection type vehicle interval control based on the measurement results of the nearby object detection device 40 may be executed during information communication type vehicle interval control, leading to an improvement in the control precision of the vehicle interval control. Furthermore, even if the information detection type vehicle interval control is not performed in combination with the information communication type vehicle interval control, a detection result obtained by the nearby object detection device 40 with regard to a preceding vehicle may be used alone to determine whether or not a preceding vehicle actually exists immediately in front of the host vehicle or the like. Moreover, according to this vehicle interval automatic control system, when the nearby object detection device 40 detects a preceding vehicle while the host vehicle is traveling alone, information communication type vehicle interval control may be initiated between the vehicles.

As described above, the vehicle control system according to the invention may be used as a technique for executing appropriate travel control.

The invention claimed is:

1. A vehicle control apparatus comprising:
a communication device installed in a vehicle to receive, from outside the vehicle, information relating to another vehicle; and
a control device installed in the vehicle to perform travel control on the vehicle using information relating to the vehicle and information relating to the other vehicle,
wherein the control device modifies a control type of the travel control in accordance with either a condition relating to the travel control currently underway or a condition of the vehicle currently being subjected to the travel control, and
wherein the control device switches the control type of the travel control between model based control based on a vehicle model and proportional derivative control in which proportional control and derivative control are executed, on the basis of the actually measured value and the control target value of the control subject of the travel control.

2. The vehicle control apparatus according to claim 1, wherein the control device modifies the control type of the travel control on the basis of a deviation between a control target value of a control subject of the travel control and an actually measured value of the control subject obtained during the travel control executed at the control target value.

3. The vehicle control apparatus according to claim 1, wherein the travel control is executed to control a vehicle interval relative to the other vehicle.

4. A vehicle control system comprising:
a communication device installed in each of a plurality of host vehicles to receive, from outside the host vehicle, information relating to another vehicle; and
a control device installed in each of a plurality of host vehicles to perform travel control on the host vehicle using information relating to the host vehicle and information relating to the other vehicle,
wherein each of a plurality of the control devices modifies a control type of the travel control in accordance with either a condition relating to the travel control currently underway or a condition of the host vehicle currently being subjected to the travel control, and
wherein the control device switches the control type of the travel control between model based control based on a vehicle model and proportional derivative control in which proportional control and derivative control are executed, on the basis of the actually measured value and the control target value of the control subject of the travel, control.

5. The vehicle control system according to claim 4, wherein each of the plurality of the control devices modifies the control type of the travel control while maintaining a number of the plurality of the host vehicles.

* * * * *